UNITED STATES PATENT OFFICE.

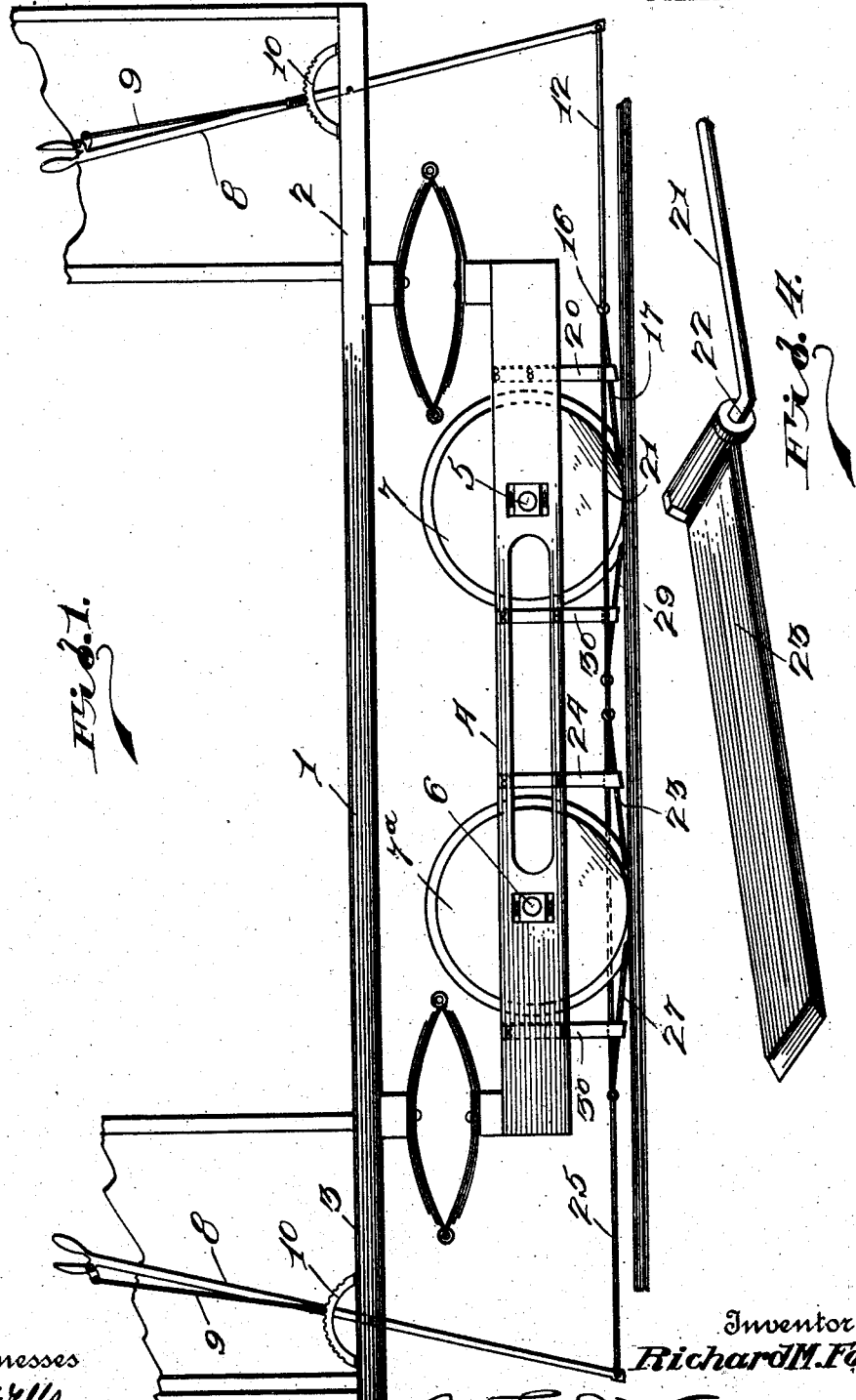

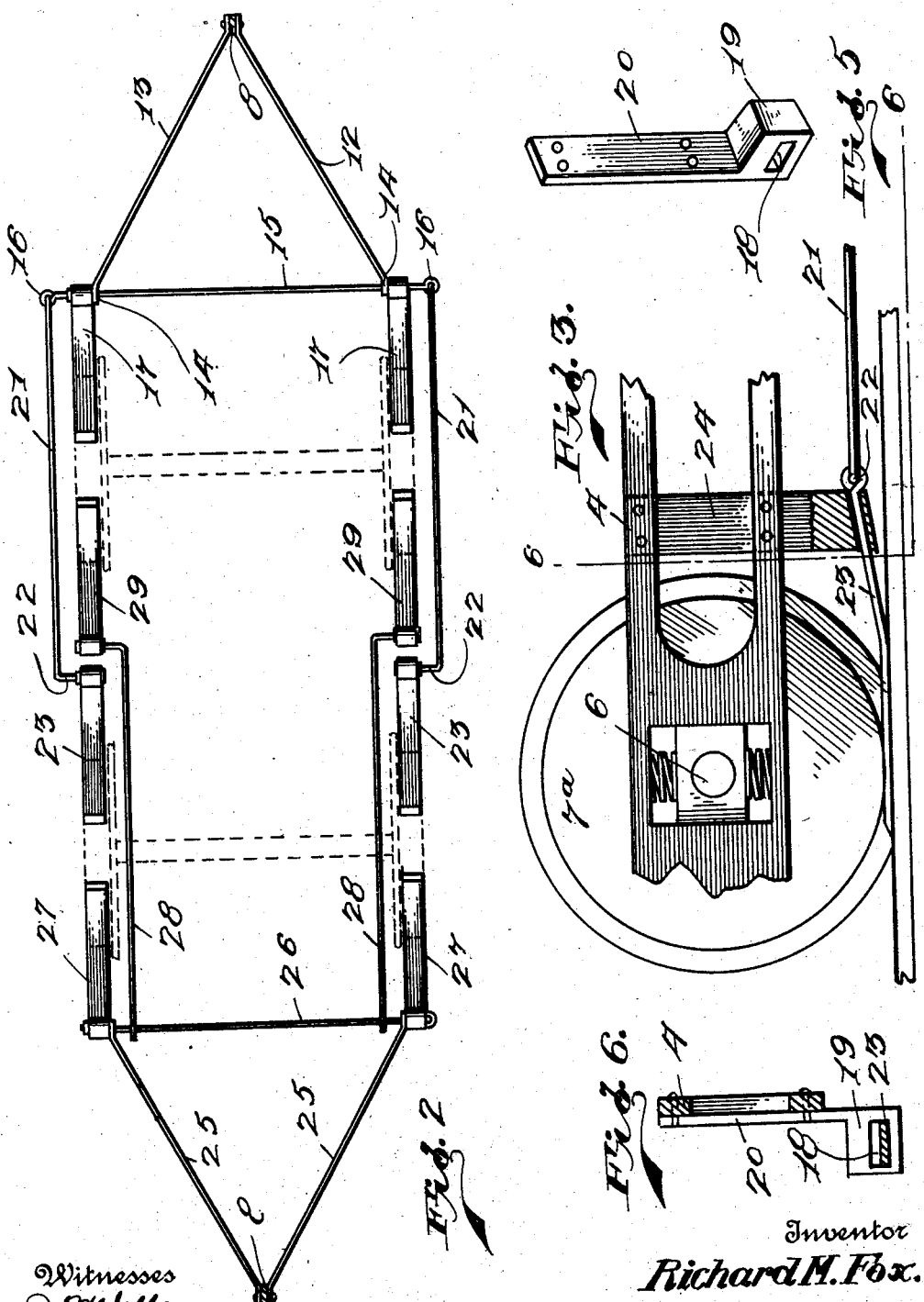

RICHARD M. FOX, OF BLUEFIELD, WEST VIRGINIA, ASSIGNOR OF ONE-HALF TO JOHN P. HUNT, OF CHATHAM, VIRGINIA.

CAR-BRAKE.

973,933.  Specification of Letters Patent.  Patented Oct. 25, 1910.

Application filed January 3, 1910.  Serial No. 535,905.

*To all whom it may concern:*

Be it known that I, RICHARD M. FOX, a citizen of the United States of America, residing at Bluefield, in the county of Mercer and State of West Virginia, have invented certain new and useful Improvements in Car-Brakes, of which the following is a specification, reference being had therein to the accompanying drawing.

This invention relates to emergency brakes for railway cars and other vehicles, and the principal object of the same is to provide an emergency brake mechanism by means of which wedging shoes may be forced between the wheels and the surface over which they are traveling so that the vehicle will be brought to a sudden stop.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a fragmentary view in side elevation of a street car, showing the improved emergency brake mechanism applied thereto. Fig. 2 is a diagrammatic plan view of the brake mechanism. Fig. 3 is an enlarged fragmentary view in side elevation of a car truck showing one of the brake shoes and its support and guide. Fig. 4 is a detail perspective view of one of the shoes and its operating arm. Fig. 5 is a similar view of one of the guiding and supporting arms. Fig. 6 is a vertical sectional view taken on the line 6—6, Fig. 3.

In the accompanying drawings, it will be observed that the improved brake mechanism has been shown applied to a street car although it will be understood, of course, that such use is but one of many to which the invention may be applied.

Referring to said drawings by numerals, 1 designates the car equipped with the usual front and rear platforms 2—3, said car being provided with the usual spring connected side beam 4 that extend longitudinally of the car and in which the axles 5—6 of the sets of wheels 7—7ª are journaled.

A hand lever 8 is pivotally mounted in each platform, the handle portion thereof being equipped with a pawl 9 adapted for engagement with a rack 10 for holding said lever in the desired position. The lever of platform 2 has its projected lower end pivotally mounted between the end of a pair of divergent rods 12—13, whose spread apart ends are equipped with an eye 14 for pivotal engagement with opposite end portions of a transversely arranged bar 15, also equipped with end eyes 16 and which has a pair of brake shoes 17 pivotally mounted thereon, one of each shoes being located between the end eyes of rods 12—13, and the end eyes of bar 15. Said shoes 17 are flat and elongated and are slidably supported in the transverse guide slots 18 of the angular ends 19 of hanger arms 20 that are suspended from beams 4 so that said shoes may be moved bodily through their guiding slots to a position in front of two of the wheels 7 so that said wheel will run onto the free end portions of said shoes, so that the wheel will be chocked, in a manner well understood.

As is shown more clearly in Fig. 2, the end eyes of bar 15 project beyond the sides of the ear, and each have one end of a longitudinally arranged bar 21 swiveled thereto, the other ends of said bars being inturned to provide a crank arm 22 upon which a shoe 23 has one end pivotally mounted, said shoes 23 being duplicates of shoes 17 and are guided in their movements to positions where they will be engaged by wheels 7ª, by means of pendent guide arms 24 that are suspended from beams 4, said guide arm being duplicates of the guide arms 20.

It will be obvious from the foregoing that the brake mechanism described will control the movement of a vehicle in one direction by jamming the shoes between wheels 7—7ª and the rails. A duplicate system is provided for controlling the movement of the vehicle in an opposite direction said system being operated from the rear platform 3 by means of the hand lever, pawl and rock bar thereon, the divergent rods 25, transverse bar 26, shoes 27 of said bar 27, rods 28 extending therefrom, its shoes 29 and guiding arms 30 therefor, being identical with the similar parts that are operated from the front platform 2. But in the latter system the rods 28 are necessarily arranged parallel with inner sides of the shoes instead of on the outer sides of the shoes, for a reason that will be obvious.

In operation, when the necessity arises for an emergency application of the brakes, it will be seen that by rocking one of the hand levers 8, one set of shoes will be forced to position in front of each wheel so that said wheels will ride upon the same thereby jamming the shoes into binding engagement with the rails and resulting in a sudden stoppage of the car. Obviously, to release the car it will have to be forced rearwardly to remove its wheels from the shoes.

What I claim as my invention is:—

1. An emergency brake mechanism for vehicles comprising operating levers, transverse bars, pivotal rod connections between said bars and said lever, brake shoes carried by said bars adapted to be forced beneath the wheels of a vehicle, a rod projecting from each end of said bars, brake shoes carried thereby, and guiding and supporting means for said shoes adapted to be suspended from a vehicle.

2. An emergency brake mechanism comprising brake shoes for engagement between wheels of a vehicle and the surface over which said wheels travel, guiding and supporting means through which said shoes are movable, and means for operating said shoes.

3. An emergency brake mechanism comprising brake shoes, a supporting arm for each shoe provided with a slot through which said shoes are movable, and means for moving said shoes through said slots.

4. An emergency brake mechanism comprising a transverse bar, brake shoes pivoted thereto, rods projecting from the ends of said bar, brake shoes pivoted to said rods, guiding and supporting means for said shoes, a platform lever, and pivotal rod connections between said lever and said transverse bar.

5. In an apparatus of the character described, the combination with a vehicle, of guides arranged in front and behind the wheels thereof, brake shoes slidably mounted in said guides, and means for operating said shoes to project the same between the wheel of the vehicle and the surface over which said wheels are traveling.

6. In an emergency brake apparatus, the combination with a vehicle, of pendent arms arranged in front and behind each wheel thereof, said arms provided with a guiding opening through their free end, a brake shoe slidable in each guide opening, and means operated from the vehicle for moving said shoes in their guide openings to place the same between the said wheels and the surface over which the wheels are traveling.

In testimony whereof I hereunto affix my signature in presence of two witnesses.

RICHARD M. FOX.

Witnesses:
R. E. MILLER,
JOHN N. PARKER.